Jan. 16, 1968  J. B. OTTESTAD  3,363,513
IMPACT RAM
Filed July 11, 1966  6 Sheets-Sheet 1

INVENTOR.
JACK B. OTTESTAD
BY
Angus & Mon
ATTORNEYS.

INVENTOR.
JACK B. OTTESTAD
ATTORNEYS.

Jan. 16, 1968   J. B. OTTESTAD   3,363,513
IMPACT RAM

Filed July 11, 1966   6 Sheets-Sheet 5

INVENTOR.
JACK B. OTTESTAD

BY *Angus & Mon*

ATTORNEYS.

United States Patent Office 3,363,513
Patented Jan. 16, 1968

3,363,513
IMPACT RAM
Jack B. Ottestad, 1442 Muirlands Drive,
La Jolla, Calif. 92037
Continuation-in-part of application Ser. No. 476,383,
Aug. 2, 1965. This application July 11, 1966, Ser.
No. 564,320
16 Claims. (Cl. 91—5)

ABSTRACT OF THE DISCLOSURE

This invention relates to an impact ram wherein a body has an internal plunger, which plunger is adapted to be axially driven relative to the body in order to deliver a blow. Means is provided for quickly impacting on the face of the plunger, energy which is stored in a chamber in preparation for rendering said blow.

---

This is a continuation-in-part of applicant's co-pending patent application, Ser. No. 476,383, filed Aug. 2, 1965, entitled, "Impact Ram," now abandoned.

This invention relates to fluid-powered impact rams.

Devices for striking bodies or surfaces are widely known. Their objective is to impart to the body or surface a quantity of energy in a relatively short time. The energy is usually derived from propelled or freely falling weights, from powered linkages, from the quick release of a fluid stored under pressure, or from an explosion. The field of mechanisms powered by quick release of a fluid stored under pressure has been the subject of much development, which development has been characterized by a steady increase in the complexity of the devices. It is an object of this invention to provide an impact means which utilizes a minimum of parts which parts are easily and inexpensively manufactured and assembled.

It is another characteristic of conventional impact rams that their energy output is not readily adjustable so that blows of greater or lesser energy can be produced. This invention provides for ready selectivity of the energy level from blow to blow.

A very serious deficiency inherent in conventional fluid-powered devices is the risk of misfire when attempting to "unload" them after the device is charged or "cocked." Occasionally it is necessary, after charging the machine, to release the energy but without causing the machine to undergo a work-cycle. This has been difficult, and sometimes even impossible, to arrange for in previously-known machines, and these machines, when once charged, remain a potential danger to their operators until after a work stroke is completed which discharges the energy. The same problem arises when the energy of the charge is only partially discharged. This invention provides a safe, fluid-powered impact device which can always safely and quickly be "unloaded" without undergoing a work cycle.

Another serious problem in conventional devices occurs when the device fires, but fails to strike a workpiece which would receive the energy. Then the traveling parts of the machine would continue in rapid motion, and serious damage to the machine is likely to result. The disadvantage and danger of such a situation is obvious, for were the machine to misfire, or fire when for some reason there were no workpiece in position (both of these being possibilities in routine factory operations), then serious damage is done to expensive capital equipment. This invention provides means which inherently decelerates the rapidly-moving parts toward the end of a stroke, so that the device is fully protected against damage from this cause.

Still another disadvantage of presently-known impact rams is the fact that their deceleration begins at a specific point in their stroke, rather than along a substantial length. An optimum blow will be delivered only at one specific location in the axial travel, and should the blow be delivered elsewhere, then a less than optimum blow will be delivered.

It is an object of this invention to provide a "coasting" feature to enable an optimum blow to be delivered over an extended axial range.

It is a further object of this invention to provide a valve which will automatically cycle the ram.

It is still another object of this invention to provide a device which, while useful for impacting objects, can also provide a steady force to act as an arbor press, for example, or to oscillate thereby to provide vibrational energy.

An impact ram according to this invention includes a body having an internal body cylinder extending along the axis of motion. The cylinder is closed at a first end of the body and open at a second end. A plunger is axially slidable in the body cylinder, and is adapted to be connected to an object, an example being an impact head for use as a hammer, which object is disposed outside the body. The plunger or means projects through the open second end of the body cylinder.

The plunger has a lateral dimension which is less than a corresponding internal lateral dimension of the body cylinder. The plunger carries a collar which makes a continuous peripheral fluid-sealing contact with the inside wall of the body cylinder. A sliding seal disposed between the plunger and the body forms one boundary of a variable volume return chamber, the other boundaries of which are an inner wall of the body, the collar, the inner wall of the body cylinder, and the exterior surface of the plunger which has said lesser lateral dimension.

A return face is disposed on the collar which faces into the said return chamber. Fuild pressure in the return chamber tends to return the plunger axially toward the first end of the body. A triggering surface on the collar faces the closed end of the cylinder.

A plunger cylinder extends axially in the plunger. A piston axially floats in the plunger cylinder. The piston makes a fluid-sealing sliding fit with the inner wall of the plunger cylinder. The plunger cylinder is open at its ends facing the said first end of the body cylinder and is closed at its other end. The piston forms an accumulator chamber of variable volume between itself and the closed end of the plunger cylinder.

A peripheral charging seal includes a surface on the plunger that is disposed laterally of the triggering surface, and a complementary surface on the body inside the cylinder. When these surfaces mate to form a seal, there is an axial spacing which forms a triggering chamber between the trigger surface and the body. The triggering chamber, when the elements of the device are in such a position, is fully enclosed. At this time, the piston faces the region of the body which is inside the seal. It faces this region through the open end of the plunger, and forms a charging chamber therein.

Respective port means is provided for admitting fluid under pressure to the return chamber, the triggering chamber, the charging chamber, and the accumulator chamber.

The following are preferred but optional features of the invention:

(1) Delay means interposed between the piston and the plunger to delay the return of the piston to its seated position, thereby enabling the plunger to coast before deceleration; and (2) Conduits for discharging fluid from the return chamber into the charging chamber in order to charge the device, thereby simplifying the construction of the ram.

The above and other features of the invention will be fully understood from the following detailed description and the accompanying drawings in which.

An impact ram 10 according to the invention has an axis 11 of motion in order that oppositely directed forces may be exerted between two objects such as a frame, and an object or surface to be struck or pressed. An example of such an object is a pin to be driven into or out of a hole. The ram includes a body 12 which encloses an axially-extending body cylinder 13. At a first end 14, the cylinder is closed by an end cap 15 that is threaded into the tubular portion 16 of the body. A peripheral sealing ring 17 seals between the tubular portion and the end cap.

At the second end of the body, there is an inwardly projecting collar 18 (FIG. 3) which includes a seal 19 and a counterbore 19a for purposes yet to be described. The second end of the body is open so as to receive and make a fluid sliding fit with a plunger 20 that is fitted into the body cylinder.

A peripheral collar 21 is formed on the plunger, and it projects laterally from a generally cylindrical side wall 22. It will now be seen that a return chamber 23 of variable volume is formed between collars 18 and 21, cylinder 13 and sidewall 22. Sidewall 22 has a lesser lateral (radial) dimension than the wall of cylinder 13. Return surface 24 (composed of portions 24a and 24b) is formed on collar 21 and presents a net lateral area to pressure in the return chamber.

A seat insert 25 is threaded to the plunger so as to form a part thereof. This insert includes an opening 25a from an inside plunger cylinder 26 to the end of the plunger adjacent to the first end of the body cylinder.

At the end of the plunger which is adjacent to said first end, there is a peripheral surface 27 that is intended to mate with a like surface 28 on the end cap. The region of collar 21 which lies radially outside of these surfaces when they are joined, and which faces toward the end cap, constitutes a triggering surface 29. The region between triggering surface 29 and the end cap, which lies radially outside of surfaces 27 and 28 when they are joined, is denoted as a triggering chamber 30.

A piston 31 is slidably fitted in plunger cylinder 26. A sealing ring 32 makes a fluid-sealing fit between the piston and the plunger cylinder. A stop shoulder 33 (FIG. 3) is formed in the plunger cylinder to limit the movement of the piston to the left in FIG. 3.

Insert 25 includes a tapered surface 35.

The region between the central portion 37 of the end cap and the piston, within the plunger cylinder, is denoted as a charging chamber 38. The region within the plunger cylinder between its closed end and the piston is denoted as an accumulator chamber 39.

Figures 1, 2:
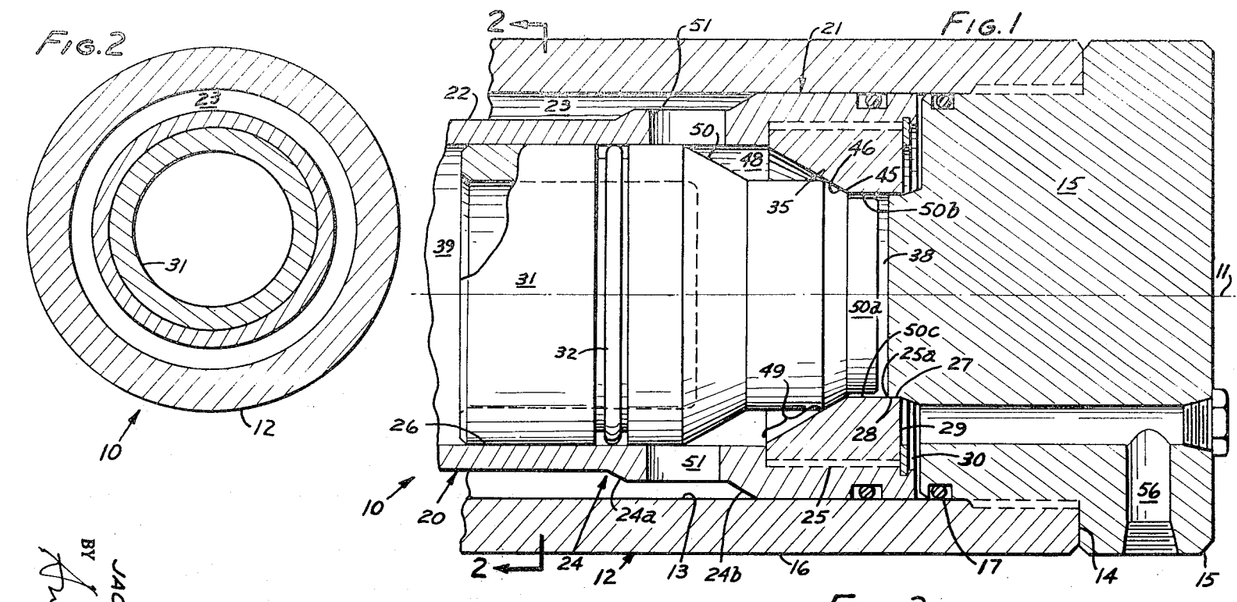
FIG. 1 is a partial view in axial cross-section of a device according to the invention.
FIG. 2 is a cross-section taken at line 2—2 of FIG. 1.

The piston carries a seat 45 intended to form a fluid-tight seal with seat 46 on insert 25 when the nose is fully to the right as illustrated in FIG. 1. In this position, there remains an annular spacing 48 between surface 49 on the seat insert and an opposed surface 50 on the piston. Charging ports 51 pass through tubular portion 22 of the plunger to interconnect spacing 48 and return chamber 23. This interconnection exists irrespective of the location of the piston in the plunger. Charging ports 51 constitute part of a fluid-supply means common to charging chamber 38 and return chamber 23. As soon as the piston moves slightly to the left in FIG. 1, spacing 48 becomes part of the charging chamber, and is included within the scope of the term "charging chamber" in all conditions.

The piston also includes an optional metering pin 50a that is adapted to enter the cylindrically-walled portion 50b of the charging chamber. An annular clearance 50c is formed between these surfaces to enable a metering action to be attained in addition to that provided between seat 45 and seat 46 when such additional metering is desired, as it usually is.

A residual charge of gas is injected into accumulator chamber 39 from a source 54 (see FIG. 8) through a valve 55. Valve 55 may be carried by the plunger. Once this residual charge is injected, it is left in the accumulator chamber, and this chamber requires no further attention except for replacing gas which may leak out.

Figures 7, 8, 9, 10, 11, 12:
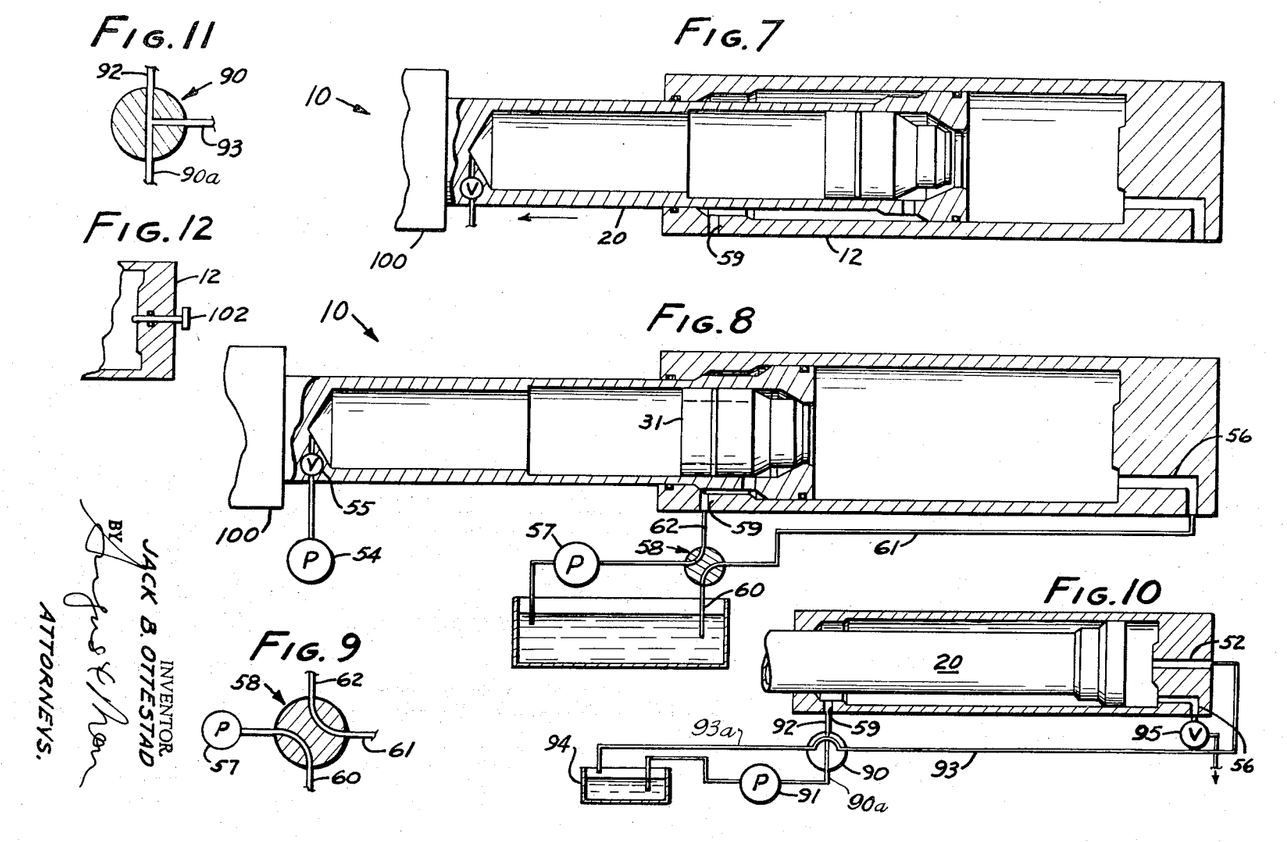
FIG. 9 is a schematic showing of a second valve condition in FIG. 8.
FIG. 10 is a fragmentary view of another embodiment of the invention.
FIG. 11 is a schematic showing of a second valve condition in FIG. 10.
FIG. 12 is a fragmentary schematic view showing an alternate triggering means.

A triggering charge port 56 (FIGS. 1 and 8) passes through the end cap and enters the triggering chamber. It receives pressure for triggering the device through conduit 61 from pressure which originated at source 57, although the energy may have been stored originally in fluid communication with conduit 62. Valve 58 has two settings. The return setting is shown in FIG. 8, where port 59 is connected to pressure and port 56 to exhaust. The other setting is shown in FIG. 9, where ports 56 and 59 are interconnected, and the pump is by-passed to the reservoir. The valve setting of FIG. 8 causes the return of the plunger and the charging of the device. The setting of FIG. 9 fires the device. Conduit 61 connects valve 58 to the triggering charge port, and conduit 62 connects valve 58 to the return charge port.

In the embodiment of FIG. 1, port 59 functions as entry for both the return and charging fluid, ports 51 serving as operating charge ports, in series connection with port 59. In the alternate embodiment of FIG. 10, the return and charging chambers are supplied by parallel rather than by series circuitry. The structural difference between the two devices is the elimination in FIG. 10 of charging ports 51 in the plunger, and the substitution therefor of charging port 52 through the end cap. Apart from this, the structures are alike. The conduitry is also somewhat different. It includes a valve 90 which has two conditions. The first is shown in FIG. 10, and the second in FIG. 11. In FIG. 10, a pressure source 91 is connected by conduit 90a to the valve and to conduit 92 and thence to return port 59. In this setting, charging port 52 is connected by conduit 93 to reservoir (exhaust) 94, all reservoirs in this invention having a lower pressure than that produced by sources such as pumps 54 and 91.

The second condition of valve 90 shown in FIG. 11, wherein conduits 92 and 93, and therefore both return and charging chambers, are connected to the pressure source.

The first condition is for the return of the plunger. The second condition is for charging and firing.

FIGS. 19–22 constitute a more detailed showing of valve 90. This valve includes a sleeve 90b with a cylindrical inner wall 90c and a rotatable, closely fitting valve core 90d therein. Ports 90e and 90f are connected to conduits 90a and 92. Port 90g is connected to conduit 93. Passage 90h includes a branch 90i at right angles. In the position illustrated, all these ports and passages are aligned. When the core is turned 45°, none is aligned.

Axially spaced from the aforesaid ports and passages are two additional passages (FIGS. 21 and 22) 90j and 90k, which are axially separated from each other, and at 90° to each other. They are at 45° to passages 90h and 90i. Ports 90l and 90m are aligned and pass through the sleeve. Ports 90n and 90p are aligned and pass through the sleeve, axially spaced from ports 90l and 90m. None of these ports and passages is now aligned. A rotation of 45° clockwise in FIGS. 21 and 22 will align them, and place passages 90h and 90i out of alignment.

Port 90l connects to conduit 93a; port 90m to conduit 93; port 90n to conduit 92; and port 90p to conduit 90a.

The condition of valve 90 in FIG. 11 in shown in FIG. 11. The condition of valve 90 in FIG. 10 will result from a 45° clockwise rotation of core 90d in FIGS. 20–22.

A triggering valve 95, which can be a three-way valve, is connected between conduit 93 and triggering port 56. In one condition, it vents triggering port 56 and the triggering chamber. In the other condition it admits pressure from conduit 93.

Figure 13:
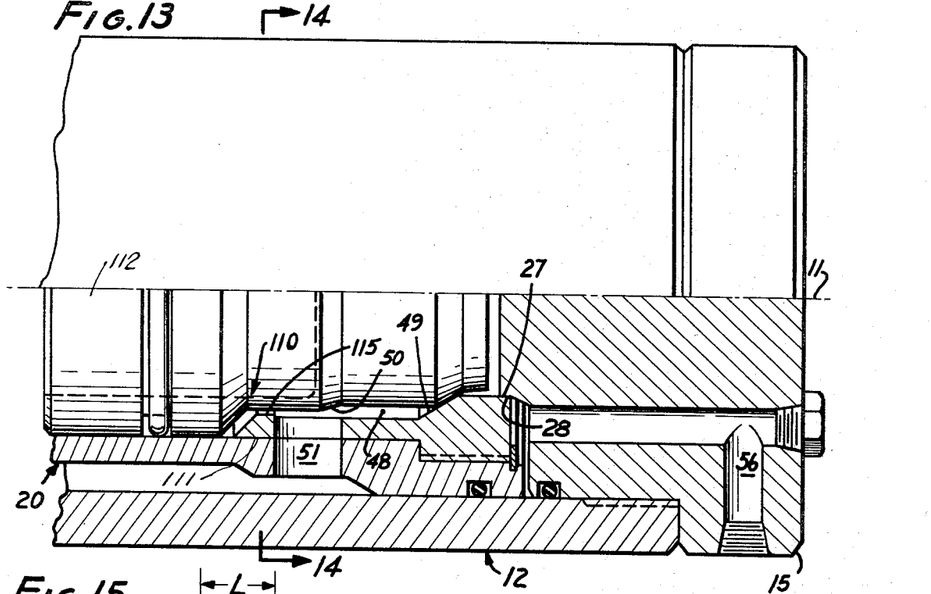
FIG. 13 is an axial partial section showing a modification of the device of FIG. 1.

FIG. 13 shows the presently-preferred embodiment of the invention. It is basically the device of FIG. 1 with a delay means 110 added. Like numbers have been used to indicate like parts. The delay means includes an extension 111 on seat member 25, which extends axially toward the second end. Port 51 continues through this extension.

A piston 112 is substituted for piston 31. It performs the same function as piston 31, and includes the same seats. However, instead of making only a single step between seat 45 and the largest diameter, it makes a double step, including a by-pass surface 113 and a metering surface 114. Radius $R_1$ of surface 114 is greater than that of surface 113.

Extension 111 includes a metering surface 115 whose radius is slightly greater than $R_1$. This forms a metering, or delay, annular gap or orifice 116 between the metering surfaces when they are axially aligned. When by-pass surface 113 and metering surface 115 are axially aligned, the annular region between them is large enough that it does not exert a significant metering action.

A metering chamber 117 is formed between face 118 on the piston and face 119 on the extension when orifice 116 is formed.

Figure 16:
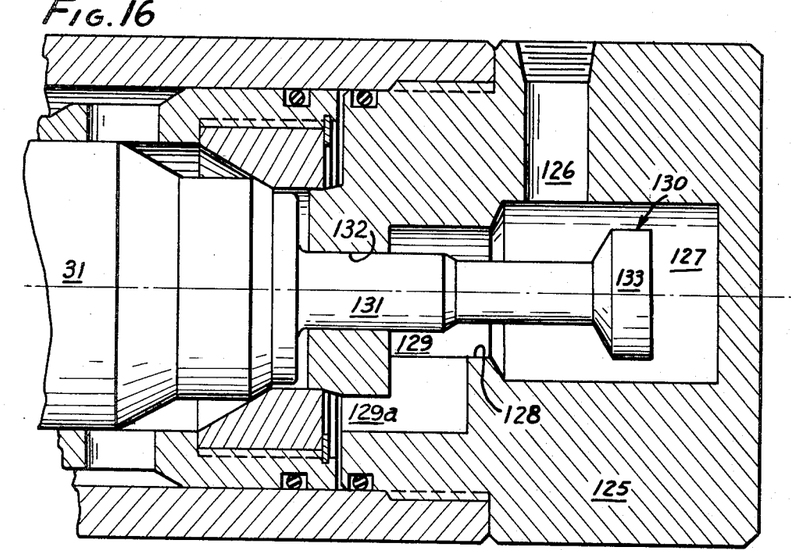
FIGS. 16–18 are axial partial sections showing another modification of the device of FIG. 1 in three operating positions.
Figure 17:
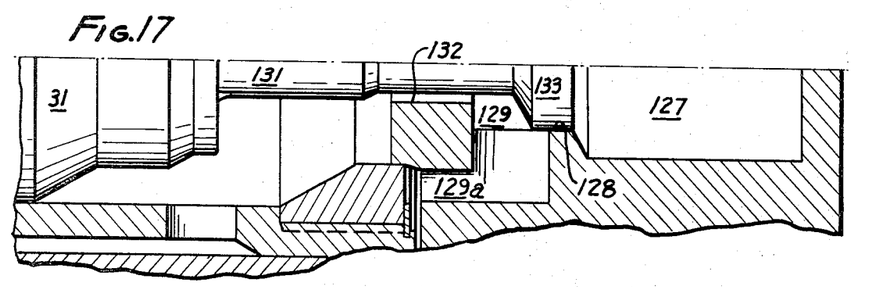
Figure 18:
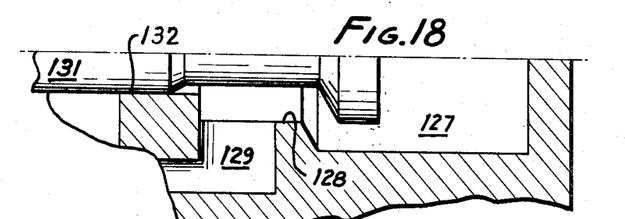
Figure 19:
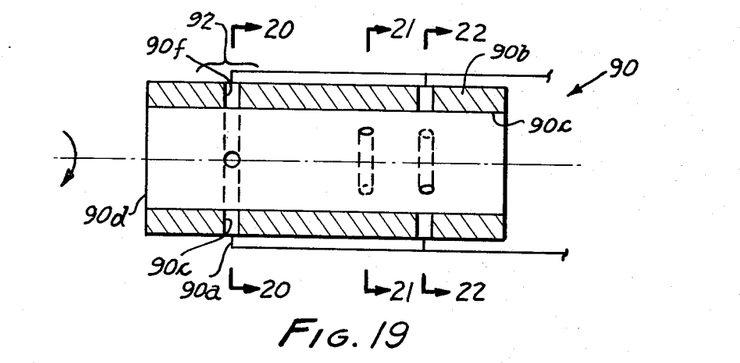
FIG. 19 is a partial cross-section of a valve shown in FIGS. 10 and 11.
Figure 20:
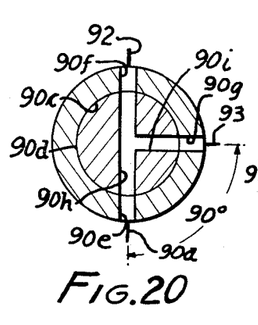
FIGS. 20–22 are cross-sections taken at lines 20—20, 21—21 and 22—22 of FIG. 19, respectively.
Figure 21:
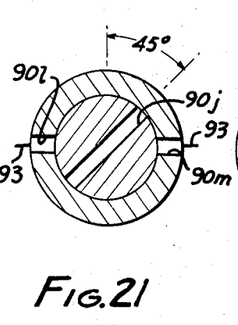
Figure 22:
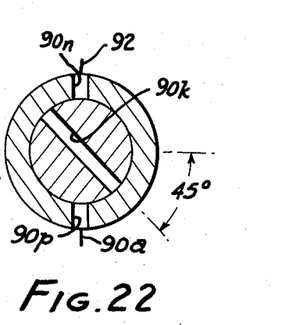

FIGS. 16–18 show a modification of the device of FIG. 1 which is self-cycling. Like numbers are used as far as possible. Cap 15 is modified to include valving elements and a poppet is added to piston 31. There is no change in the remainder of the device.

Cap 125, which is substituted for cap 15, is like cap 15 except that port 126 is simply a vent, and it enters a vent chamber 127 on the opposite side of a valve land 128 from the piston. A cycling chamber 129 is disposed on the other side of valve land 128 and connected to the triggering chamber by passage 129a. Both chambers surround a poppet 130 which is attached to the nose of piston 31.

Poppet 130 includes a valve land 131 which makes a reasonably close fit in valve land 132 of the cap, although some minor leakage past land 132 is tolerable. However, lands 131 and 132 should make a reasonably good seal to enable the device to cycle at optimum rates and efficiencies.

Valve land 133 on the poppet is adapted to make a similar class of fit with valve land 128. The lengths and locations of the lands are such that lands 131 and 132 are overlapped until lands 128 and 133 are overlapped, after which the former separate. Thus, in the position of FIG. 16, the distance from the left edge of land 132 to the right edge of land 131 is greater than the distance from the right edge of land 128 to the left edge of land 133.

The operation of the device of FIG. 1 as an impact ram is as follows.

Initially the accumulator chamber will be charged with its residual charge. The pressure of this residual charge is one of the determinants of the energy output of the impact ram. In one device wherein the diameter of the plunger cylinder is about 3 inches, nitrogen gas, or some other inert gas is injected into the accumulator chamber to a pressure of between about 1000 p.s.i.g. and about 1500 p.s.i.g. At this time all other regions in the device are vented to atmosphere. Then valve 55 is closed. As a result of this residual charge, the piston will be moved relative to the plunger to the location shown in FIG. 1, with the piston firmly seated against insert 25, a seal being made between seats 45 and 46. However, a tight fluid seal is not essential, although it is desirable. The same is true of the other seals in these devices, because minor leakage therein does not impede the function of the device, nor render it liable to misfires.

Figure 3:
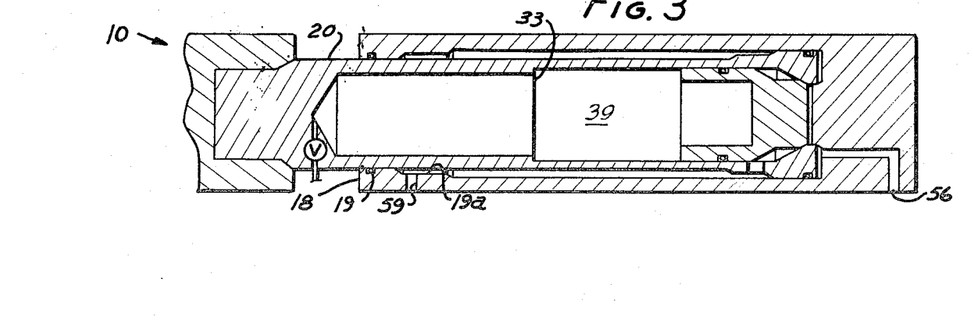
FIGS. 3–8 are axial cross-sections showing the device of FIG. 1 in successive operative positions.

At this time, the position of the plunger in the body is indefinite. Next, valve 58 is set to the condition of FIG. 8, in order to vent triggering port 56 and supply fluid under pressure to port 59. Now fluid enters return chamber 23, and through ports 51, enters spacing 48. Because there is only exhaust pressure in opposition on the right hand side of the plunger (or, if there is only a metering action, a lesser pressure on the right side,) a net pressure is exerted on the return surface to move the plunger fully to the right, to the position shown in FIG. 1. At this position, surfaces 27 and 28 meet and seal, and triggering chamber 30 is fully isolated from the rest of the system. This condition is shown in FIG. 3.

Figure 4:
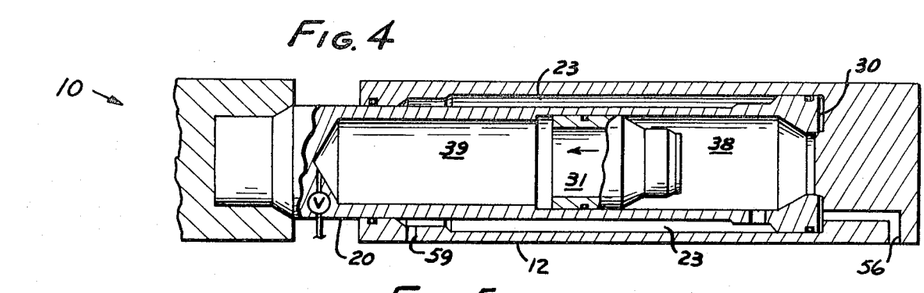

Rising pressure applied in spacing 48 through ports 51 now begins to overcome the resistance of the gas acting on the piston and moves the piston to the left. This is the start of the charging operation which is shown partially completed in FIG. 4. Pressure in the charging chamber is now exerted over the full right hand area of the piston, the seal having been broken at 45, 46 if one was initially made. The plunger is locked in the position of FIG. 1, because of the different forces on the return and triggering surfaces, the force on the return surface being the greater. The residual charge in accumulator chamber 39 is compressed as the piston moves to the left, the amount of compression being proportional to the pressure exerted in charging chamber 38. There therefore exists a discrete axial position of the piston in the plunger for each pressure level within a wide range, and the energy level can be set by adjusting the charging pressure.

Figure 5:
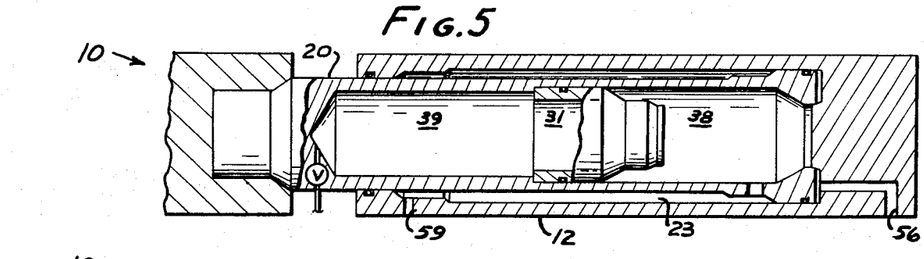

If the charging pressure is great enough, the piston will be moved against stop 33, and there will be no further compression of the accumulator charge. This condition is shown in FIG. 5, where the unit is "charged" or "cocked," and ready to "fire." In the example given, a charge pressure of 2500 p.s.i.g. is often used. Energy is now stored in the accumulator chamber, and the plunger is locked onto the body by pressure on return surface 24.

At this time it is perfectly safe to vent charging chamber 38, and the energy will harmlessly be dissipated and the device safetied, should a work stroke not be desired. The piston would simply return to its initial position at the open end of the plunger. This is a very important safety advantage over prior art devices.

Figure 6:
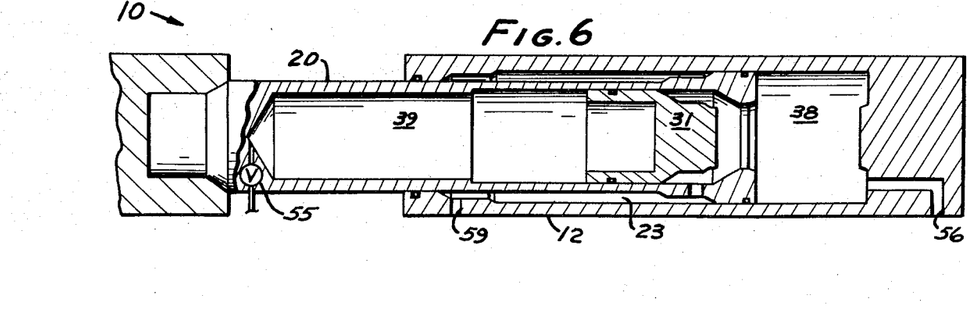

Assuming the charge is to be used for impact purposes, the ram may be triggered by changing valve 58 to the condition of FIG. 9, thereby to apply pressure to triggering port 56 and triggering chamber 30. The force in the triggering chamber will overcome the force holding the seal at surfaces 27 and 28 and move the piston axially to the left, and the triggering and charging chambers are fully interconnected past the separated surfaces. Now, and quite suddenly, the charge pressure is exerted over the full area of the right-hand face of the plunger. The plunger therefore moves to the left, as shown in FIG. 6.

The movement of the plunger to the left is caused by movement of the piston to the right (relative to the plunger), thereby exerting the energy of the accumulator charge on the liquid in the charging chamber. The plunger expels liquid from the plunger cylinder into the body cylinder as it moves.

Preferably, the piston will approach the end of its stroke and have transferred the maximum energy to the plunger, by the time the plunger has traveled between about ⅓ and ½ of its maximum length of stroke. The device is shown approaching this condition in FIG. 6, and at this condition in FIG. 7. It is preferable for impact to occur at the point shown in FIG. 7, and the impact would dissipate the energy.

However, now assume that nothing is struck by a body such as hammer 100, or that the blow is not totally absorbed. Then the plunger must decelerate, or the device will be damaged. The remainder of the stroke accomplishes that deceleration, and the condition is shown in FIGS. 7 and 8.

Note in FIG. 7 that, with the plunger moving left, the return chamber is decreasing in volume. The major escape of its fluid is through conduits 51. Some, but only a limited amount, will go through conduits 61 and 62. This second flow path is not necessary, and the conduitry could be revised to eliminate it, if desired. Spacing 48 is closed by the piston at seats 45 and 46 when the piston is all the way to the right. This will cause the pressure to rise in the return chamber and in spacing 48, and this rise in pressure will shift the piston to the left to open up the passage through the plunger at a clearnace 101. This becomes a high-pressure decelerating restraint on the plunger adequate fully to decelerate the plunger while still preventing fluid-lock and attendant damage to the device by opening up in response to excessive pressures. Ports 51 are quite large in total area, and are ample to transfer the liquid from return chamber 23 to charge chamber 38 during the stroke.

Finally, the end of the stroke is reached as shown in FIG. 8, and recycling can be done.

Counterbore 19a provides a residual chamber for return fluid, and also keeps port 59 from being blocked by the plunger.

To repeat the cycle, the plunger will be returned to seal at surfaces 27 and 28 by introducing pressure into return chamber 23, and venting the port 56. Continuing application of pressure at port 59 will compress the charge in accumulator chamber 39 to ready the machine for another stroke. Applying pressure to triggering chamber 30 initiates the stroke.

Attention is called to the fact that seals 27 and 28 are cylindrical. They need not be, but it has been found that when the device is being cycled rapidly, for example once per second, that if laterally-extending seals are used, they may bounce, and the device chatters and slows down. There can be no bounce between concentric cylindrical seals. Slight leakage between these seals is of no consequence, because the triggering chamber is vented.

In the embodiment of FIG. 10, the return stroke is caused by setting valve 95 to vent (back to reservoir), and valve 90 in the condition of FIG. 10. To charge, valve 90 is set to the condition of FIG. 11. To fire, valve 90 is left in the condition of FIG. 11, and triggering valve 95 is set to admit pressurized fluid from conduit 93 to the triggering chamber.

Deceleration in this case is caused by the metering effect of port 59, and also of the shoulder portions 24a and 24b with collar 18 near the end of the stroke.

The triggering circuitry is optional in all embodiments. Instead of fluid circuitry, a triggering pin 102 could be provided through the end cap mechanically to force the plunger off its seat with the body to initiate the cycle. Triggering chamber 30 is not placed under pressure to trigger the device in the embodiment of FIG. 12 as it is in the embodiment of FIG. 1. In FIG. 12 a mechanical force to move the plunger away from end cap 15 is exerted directly on the plunger by pin 102. However, in both embodiments, chamber 30 must be provided in order for the plunger to be retained in the charged condition until it is fired, and the term "triggering" is used in both embodiments as a matter of convenience and uniformity in description even though the chamber itself is not used for the provision of a fluid triggering force in the embodiment of FIG. 12.

The peripheral seals, cylinders and chambers are all preferably coaxial and round. The relative motions are all axial, along axis 11.

Figure 14:
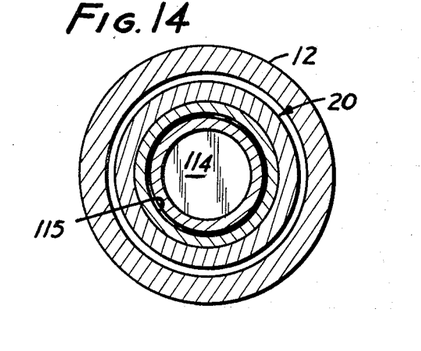
FIG. 14 is a cross-section taken at line 14—14 of FIG. 13.
Figure 15:
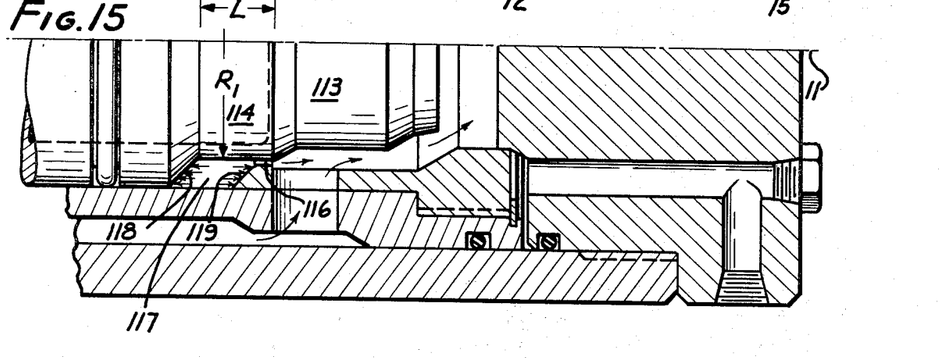
FIG. 15 is the same view as FIG. 13, with the device in another operating position.

The blow-imparting operations of the device of FIGS. 13–15 are as in FIGS. 1–10. However, it will be noted that deceleration begins when the piston has moved all the way to the open end of the plunger so that seats 45 and 46 shut off flow from the return chamber to the charging chamber. Delaying this closure will enable the plunger to coast. That is the purpose of the delay means. So long as by-pass surface 113 and metering surface 115 are aligned, the function is as already described. However, when metering surfaces 114 and 115 are aligned, then the flow of liquid from metering chamber 117 is metered and delay by orifice 116. This delays the closing of seats 45 and 46, and fluid continues to transfer through ports 51 from the return chamber to the charging chamber and the plunger coasts. Finally the piston reaches the position of FIG. 13, and deceleration begins as in FIG. 1. The benefit is, of course, the opportunity to strike an optimum blow at any point along a significant axial extent.

The blow-imparting operation of the device of FIGS. 16 and 17 is as in FIGS. 1–15. The modification of FIGS. 16–18 may be utilized in any of them.

FIG. 16 shows the start of a cycle. Lands 131 and 132 close off the charging chamber. Cycling chamber 129 is vented, as is the triggering chamber, past land 128. As the device is charged, the plunger is held to the cap and the piston moves to the left. Lands 128 and 133 join, closing the vent to passage 129a and the triggering chamber. Then land 131 clears land 132 (FIG. 17). This releases pressure from the charging chamber into the triggering chamber, through passage 129a, firing the device.

After firing, and during recharging, the piston returns gradually toward the right (FIG. 18), first closing the charging chamber at lands 131 and 132, and opening the cycling chamber to vent. This enables the plunger and the piston to return to the position of FIG. 16 and the cycle will repeat.

Note that the only reversal of flow direction is in the short passage 129a, rather than in long lines. Flow through long lines is unidirectional.

When it is desired for the device to be selectable between automatic and manual operation, then a port 56 will tap chamber 129, and a valve will be provided to cut off chambers 127 and 129 from passage 129a, and, if necessary, chambers 127 and 129 connected to vent one to the other to enable the poppet to move without restriction.

In one practical device according to FIG. 13, in a total stroke of about 10 inches, there are about 3½ inches of accelerative movement, about 3 inches of coasting movement available, and about 3½ inches of decelerative movement available.

Any suitable gas may be used where gas is called for, but preferably the gas used should be inert and inexpensive. Nitrogen is the preferred gas. Any good hydraulic fluid which will not break down under the rapid flow conditions involved herein may be used anywhere in the device where liquid is called for.

Either embodiment of the device can also be used to apply a steady force, simply by venting the return chamber to reservoir and applying pressure through the triggering port. Return motion is accomplished by reversing these connections. When this use is contemplated, then a seal should be provided at seats 45 and 46, and this seal will remain tight at pressures in the charging chamber wherein the force against the piston is less than that of the accumulator charge.

With this arrangement, the device can also provide a vibrational effect, for when the plunger bears against a suitable resistance and the pressure in the charging chamber rises enough to unseat the piston, then there will be a temporary relief of pressure in the charging chamber because of flow past seats 45 and 46 into the vented return chamber. The resistant load (which might be derived from a supporting vehicle) would then cause the plunger to move slightly. When the pressure is relieved enough that seats 45 and 46 again seat, then the original force on the plunger is restored, and the cycle is automatically repeated. This cycling can be quite rapid.

The invention provides a versatile impact ram which can be made in a wide range of sizes, each of said sizes beng operable over a wide range of residual accumulator charges and charge levels in charging chamber 38, which is fail safe, includes effective deceleration means, and can be used as a standard press and as a vibrating press. Its simplicity is evident from the drawings. It requires only a minimum of parts, all of simple configuration, with only a minimum of critical dimensions.

It is to be noted that the accumulator charge need not be fully compressed to operate the device. The device is as ready to operate in FIG. 4 as it is in FIG. 5. However, the energy of the blow in FIG. 4 would be less than of the blow delivered from the condition of FIG. 5, assuming equal residual accumulator pressures.

This invention is not to be limited by the embodiments shown in the drawings and descrbed in the description, which are given by way of example and not of limitation, but only in accordance with the scope of the appended claims.

I claim:

1. An impact ram having an axis, comprising: a body having an internal, axially-extending body cylinder; a plunger having an internal, axially-extending plunger cylinder; a piston axially slidably fitted in said plunger cylinder, the body and plunger, and the piston and plunger being relatively axially slidable; a laterally-extending collar on the body making a substantially fluid-sealing fit with the external surface of the plunger, a laterally-extending collar on the plunger making a substantially fluid-sealing fit with the body cylinder, whereby a return chamber of variable volume is defined by the body cylinder, the plunger and the collars; a return surface on the plunger collar facing into the return chamber; a triggering surface on the plunger collar facing toward a first, closed end of the body within the body cylinder; a peripheral seal carried by the body at said first end thereof inside the body cylinder; a peripheral seal carried by the plunger at its end adjacent said seal on the body, the plunger cylinder having an opening communicating with said last-named seal, whereby the two said seals are adapted to make a fluid-sealing closure when the plunger is moved to its full extent toward said first end, said closure separating a triggering chamber formed between the said first end and the triggering surface within the body cylinder from a charging chamber formed between said first end and the piston inside the plunger cylinder, the opposite end of the plunger cylinder being closed, whereby the piston forms an accumulator chamber of variable volume, said accumulator and charging chambers being separated from each other by the piston; an accumulator port opening into the accumulator chamber for admitting gas under pressure thereinto; means movable with the piston for containing the gas in the accumulator chamber; conduitry opening into the body in fluid communication with both the return and charging chambers; valve means controlling flow of fluid into and out of said conduitry; and triggering means for moving the plunger away from said first end; whereby when fluid under pressure in the conduitry enters the return chamber, it moves the plunger to said full extent to cause said seals to seat and then enters the charging chamber to move the piston against the gas in the accumulator chamber, and thereafter the triggering means next are actuated to move the plunger so as to separate the seals and exert pressure of the charging chamber over the full lateral area of the plunger, and the plunger body moves axially so as to increase the spacing between the first end of the body and the triggering surface under force derived from pressure in the charging chamber.

2. An impact ram according to claim 1 in which the opening in the plunger adjacent said first end is tapered narrowing toward said first end, and in which the piston includes a reduced portion adapted to enter said opening so as to gradually reduce the lateral separation between them, thus decelerating the plunger's motion away from the first end.

3. An impact ram according to claim 2 in which the piston has a seat on a portion thereof which is adapted to contact the plunger, and which in this position holds the piston so that a spacing exists between the piston and the plunger in fluid communication with the charging port.

4. An impact ram according to claim 1 which the said seals are concentric, cylindrical, and have substan'ially equal diameters so as to form a sliding seal.

5. An impact ram according to claim 1 in which a stop shoulder is formed in the plunger cylinder, spaced from the open end for limiting the travel of the piston away from said first end.

6. An impact ram according to claim 5 in which the opening in the plunger adjacent said first end is tapered, narrowing toward said first end, and in which the piston includes a reduced portion adapted to enter said opening so as to gradually reduce the lateral separation between them, thus decelerating the plunger's motion away from the first end.

7. An impact ram according to claim 1 in which the triggering means comprises a mechanical element adapted to force the plunger away from said first end.

8. An impact ram according to claim 1 in which the triggering means comprises a triggering port opening into the triggering chamber, and a conduit adapted to supply fluid under pressure thereto.

9. An impact ram according to claim 1 in which the conduitry comprises a return port opening through the body into the return chamber for admitting fluid under pressure into the return chamber; a charging port opening into the charging chamber for admitting fluid under pressure thereto; and a valve adapted to connect both of said ports to a source of pressure in one condition, and to connect the return port to pressure and the charging port to exhaust in another condition.

10. An impact ram according to claim 1 in which the conduitry comprises a return port opening through the body into the return chamber, and a charging port opening through the wall of the plunger and interconnecting the return and charging ports therethrough.

11. An impact ram according to claim 1 in which the piston has a seat on a portion thereof which is adapted to contact the plunger, and which in this position holds the piston so that a spacing exists between the piston and the plunger in fluid communication with the charging port.

12. An impact ram according to claim 1 in which delay means is interposed between the plunger and the piston to delay the return of the piston toward the open end of the plunger and thereby delay the deceleration of the plunger.

13. An impact ram according to claim 12 in which the delay means comprises a pair of axially-extending surfaces on the piston, one having a greater and the other a lesser lateral dimension, and a metering surface on the inside of the plunger spaced laterally from the surface having the greater lateral dimension, whereby to form a metering orifice when they are axially aligned, and to form a larger by-pass when axially aligned with the surface of lesser lateral dimension.

14. An impact arm according to claim 10 in which delay means is interposed between the plunger and the piston to delay the return of the piston toward the open end of the plunger and thereby delay the deceleration of the plunger.

15. An impact ram according to claim 14 in which the delay means comprises a pair of axially-extending surfaces on the piston, one having a greater and the other a lesser lateral dimension, and a metering surface on the inside of the plunger spaced laterally from the surface having the greater lateral dimension, whereby to form a metering orifice when they are axially aligned, and to form a larger by-pass when axially aligned with the surface of lesser lateral dimension.

16. An impact ram according to claim 10 in which the piston has a seat on a portion thereof which is adapted to contact the plunger, and which in this position holds the piston so that a spacing exists between the piston and the plunger in fluid communication with the charging port.

References Cited
UNITED STATES PATENTS

| | | | |
|---|---|---|---|
| 3,103,136 | 9/1963 | Bollar | 60—52 |
| 3,158,048 | 11/1964 | Bollar | 92—8 |
| 3,205,790 | 9/1965 | Bollar | 73—12 |
| 3,267,677 | 8/1966 | Bollar | 60—54.5 |
| 2,679,827 | 6/1954 | Perdue | 91—4 |
| 2,829,498 | 4/1958 | Ferguson | 60—54.5 |
| 3,105,414 | 10/1963 | Cvjetkovic et al. | 91—417 |
| 3,200,715 | 8/1965 | Ottestad | 91—392 |
| 3,202,059 | 8/1965 | Ottestad et al. | 91—392 |
| 3,266,869 | 8/1966 | Dengler | 92—51 |
| 3,311,049 | 3/1967 | Hugi | 91—173 |

MARTIN P. SCHWADRON, *Primary Examiner.*

PAUL E. MASLOUSKY, *Assistant Examiner.*

UNITED STATES PATENT OFFICE

CERTIFICATE OF CORRECTION

Patent No. 3,363,513                                              January 16, 1968

Jack B. Ottestad

It is hereby certified that error appears in the above numbered patent requiring correction and that the said Letters Patent should read as corrected below.

Column 2, line 38, for "Fuild" read -- Fluid --; line 46, for "ends" read -- end --; line 54, for "trigger" read -- triggering --; column 8, line 55, for "selectable" read -- selectible --; column 10, line 15, after "tapered" insert a comma; line 27, after "1" insert -- in --; column 11, line 6, for "arm" read -- ram --.

Signed and sealed this 25th day of February 1969.

(SEAL)
Attest:

Edward M. Fletcher, Jr.
Attesting Officer

EDWARD J. BRENNER
Commissioner of Patents